(12) United States Patent
Kim et al.

(10) Patent No.: US 11,182,778 B2
(45) Date of Patent: Nov. 23, 2021

(54) PLATFORM FOR OFFER DETERMINATION AND PRESENTATION VIA INTERNET OF THINGS

(71) Applicant: Visa International Service Association, San Francisco, CA (US)

(72) Inventors: Nancy Kim, San Francisco, CA (US); Sharon L. Gibson, San Francisco, CA (US); Kelvan Howard, San Francisco, CA (US); Ann Wang Reed, Foster City, CA (US); Rajive Gupta, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 765 days.

(21) Appl. No.: 15/166,097

(22) Filed: May 26, 2016

(65) Prior Publication Data

US 2017/0344982 A1    Nov. 30, 2017

(51) Int. Cl.
*G06Q 10/10* (2012.01)
*G06Q 20/38* (2012.01)
(Continued)

(52) U.S. Cl.
CPC ....... *G06Q 20/3829* (2013.01); *G06Q 10/083* (2013.01); *G06Q 20/12* (2013.01);
(Continued)

(58) Field of Classification Search
CPC ............. G06Q 20/3829; G06Q 20/405; G06Q 20/203; G06Q 20/145; G06Q 20/12;
(Continued)

(56) References Cited

U.S. PATENT DOCUMENTS

| 5,742,845 A | 4/1998 | Wagner |
|---|---|---|
| 7,676,393 B2 | 3/2010 | Postrel |

(Continued)

FOREIGN PATENT DOCUMENTS

WO    2015016767    2/2015

OTHER PUBLICATIONS

S. Luo, H. Xia, Y. Gao, J. S. Jin and R. Athauda, "Smart Fridges with Multimedia Capability for Better Nutrition and Health," 2008 International Symposium on Ubiquitous Multimedia Computing, Hobart, ACT, 2008, pp. 39-44, doi: 10.1109/UMC.2008.17. (Year: 2008).*

(Continued)

*Primary Examiner* — Rashida R Shorter
(74) *Attorney, Agent, or Firm* — Kilpatrick Townsend & Stockton LLP

(57) ABSTRACT

Techniques described herein include a platform and process enabling an electronic appliance to locally store payment credentials, loyalty point information, receive price comparison information for an item, redeem rewards or loyalty points to determine a best offer for the item, and enable delivery of said item to a user with minimal user interaction. In some embodiments, an electronic appliance can receive a query for offers for an item, receive order information from a plurality of merchants about the item, and apply loyalty points to determine an offer for the item. Upon receiving confirmation the electronic appliance may transmit access credentials for ordering the item for delivery and updating the loyalty point information for the account utilized to purchase the item from the determined offer.

16 Claims, 5 Drawing Sheets

(51) Int. Cl.

| | |
|---|---|
| *G06Q 20/36* | (2012.01) |
| *G06Q 20/12* | (2012.01) |
| *G06Q 20/14* | (2012.01) |
| *G06Q 20/20* | (2012.01) |
| *G06Q 20/40* | (2012.01) |
| *G06Q 10/08* | (2012.01) |
| *G06Q 30/02* | (2012.01) |
| *H04L 12/28* | (2006.01) |

(52) U.S. Cl.
CPC ......... *G06Q 20/145* (2013.01); *G06Q 20/203* (2013.01); *G06Q 20/363* (2013.01); *G06Q 20/405* (2013.01); *G06Q 20/4014* (2013.01); *G06Q 30/0233* (2013.01); *H04L 12/2823* (2013.01)

(58) Field of Classification Search
CPC ............. G06Q 20/363; G06Q 30/0233; G06Q 20/4014; G06Q 10/083; G06Q 30/0207; G06Q 30/0611; G06Q 30/0229; G06Q 30/02; H04L 12/2823
See application file for complete search history.

(56) References Cited

U.S. PATENT DOCUMENTS

| | | |
|---|---|---|
| 7,813,955 B2 | 10/2010 | Ariff |
| 7,827,057 B1 | 11/2010 | Walker |
| 9,602,508 B1* | 3/2017 | Mahaffey ............ H04L 63/0869 |
| 2002/0194069 A1 | 12/2002 | Thakur |
| 2009/0106112 A1 | 4/2009 | Dalmia et al. |
| 2009/0112721 A1 | 4/2009 | Hammad |
| 2009/0125386 A1 | 5/2009 | Willison et al. |
| 2012/0143669 A1 | 6/2012 | Anantha et al. |
| 2012/0323717 A1* | 12/2012 | Kirsch ............... G06Q 20/0855 705/26.1 |
| 2013/0046624 A1* | 2/2013 | Caiman .............. G06Q 30/0259 705/14.53 |
| 2013/0046626 A1 | 2/2013 | Grigg et al. |
| 2013/0082819 A1* | 4/2013 | Cotterill ................ H04L 63/083 340/5.51 |
| 2013/0144699 A1 | 6/2013 | Xavier et al. |
| 2013/0339116 A1 | 12/2013 | Schwarzkopf et al. |
| 2015/0026007 A1* | 1/2015 | Mangalvedkar ... G06Q 30/0633 705/26.8 |
| 2016/0063569 A1 | 3/2016 | Williams |
| 2016/0140526 A1* | 5/2016 | Cummins ............ G06Q 20/308 705/28 |
| 2016/0171479 A1 | 6/2016 | Prakash |
| 2017/0053301 A1* | 2/2017 | Khan ................. G06Q 30/0222 |

OTHER PUBLICATIONS

Samuel Greengard, "Consumer Devices Get Smart," in The Internet of Things, MIT Press, 2015, pp. 79-110. (Year: 2015).*

PCT/US2017/031970, "International Search Report and Written Opinion", dated Aug. 14, 2017, 12 pages.

EP17803276.9, "Extended European Search Report", dated Jun. 25, 2019, 8 pages.

* cited by examiner

PLATFORM FOR OFFER DETERMINATION AND PRESENTATION VIA INTERNET OF THINGS

CROSS-REFERENCES TO RELATED APPLICATIONS

None.

BACKGROUND

Advances in network technology and e-commerce infrastructures currently allow users to order items and shop online via desktop or laptop computers. Typical households may include a number of computers from which a user can easily shop and complete purchases related to items offered by e-commerce websites. However, users may complete purchases while unaware of other offers for similar items provided by other merchants. Further, users utilizing household computers may be subject to certain security vulnerabilities such as viruses or other forms of data theft that can result in sharing of sensitive information such as bank account information. Users may forget or lose important information for completing a transaction, such as personal identification numbers (PIN) required for completing a transaction when interacting with e-commerce websites when utilizing conventional means. This can result in a user failing to complete a necessary transaction or forgetting to order required items. Users may experience buyer's remorse upon finding out about the other offers or when the particular merchant provides an inferior product or poor quality service. A user's shopping experience may be further frustrated by ignoring or forgetting about loyalty points accrued by utilizing particular payment methods or by shopping with particular merchants. Conventional methods of utilizing loyalty points are limited to providing a user with a paper catalog or online catalog that includes a limited item selection from limited merchants with no crossover between merchants or type of points acquired. Further, interacting with such conventional methods of redeeming loyalty points can include the proliferation of sensitive account or personal information of the user with third party loyalty point providers when seeking to redeem said points. Users may wish to complete purchases for items while interacting with other devices or appliances within the household. Thus, a user may experience a low quality shopping experience by being uninformed about a best offer and attempting to make an order while using an appliance for its primary function.

Embodiments of the invention address this and other problems, individually and collectively.

BRIEF SUMMARY

Embodiments of the present invention are directed to systems and methods in which an electronic appliance device can locally store payment credentials, loyalty point information, receive price comparison information for an item, redeem rewards or loyalty points to determine a best offer for the item, and enable delivery of said item to a user with minimal user interaction. In some embodiments, an application configured to run on the electronic appliance device may provide the device with a connection to the loyalty point information and/or the payment credentials. In embodiments, the application may be pervasive across one or more electronic appliance devices associated with a user and may be utilized to connect a user across said devices. For example, a user's refrigerator may be connected to their mobile phone where each device is capable of keeping track of transactions conducted, points earned and/or debited, and able to provide offers or answer queries for item searches as described herein.

Some embodiments of the invention are directed to a method including receiving, by an electronic appliance, an indication of a purchase for an item. In embodiments, the electronic appliance may maintain loyalty point information associated with an account of a user. In some embodiments, the method includes receiving, by the electronic appliance, order information about the item from a plurality of merchant computers. The method may include determining, by the electronic appliance, an offer for the item based at least in part on the loyalty point information and the order information from the plurality of merchant computers. The offer may be determined by applying loyalty points identified in the loyalty point information to the offer for the item identified in the order information. In some embodiments, the method may include presenting, by the electronic appliance, the determined offer via a user interface associated with the electronic appliance. The method may further comprise receiving, by the electronic appliance, input via the user interface that confirms purchase of the item included in the determined offer. In some embodiments, the method includes updating, by the electronic appliance, the loyalty point information associated with the account of the user. The method may further comprise identifying, by the electronic appliance, access credentials for ordering the item from a particular merchant computer of the plurality of merchant computers based on device information associated with the electronic appliance. In some embodiments the method may include ordering, by the electronic appliance from the particular merchant computer, the item for delivery based on providing the access credentials to the particular merchant computer.

In some embodiments, ordering the item for delivery includes identifying a location of the user. In embodiments, the account includes information identifying the location of the user.

In some embodiments, the method may further comprise providing to an authorization computer the access credentials for an authorization request. In embodiments, ordering the item for delivery is based at least in part on receiving, from the authorization computer, an authorization response based on the authorization request.

In some embodiments, receiving the input that confirms the purchase of the item included in the determined offer includes utilizing the loyalty points to complete the purchase.

Embodiments of the invention are further directed to an electronic appliance comprising a processor and a memory element. The memory element can comprise code, executable by the processor, for implementing any of the methods described herein.

Embodiments of the invention are further directed to a non-transitory computer-readable storage medium storing computer-executable instructions that, when executed by a computer system, configure the computer system to perform operations for implementing any of the methods described herein. In some embodiments, the instructions may include receiving a query for offers of an item. The instructions may further include maintaining loyalty point information associated with an account of a user. The instructions may further comprise determining an offer for the item based at least in part on the loyalty point information and the order information from the plurality of merchant computers. The offer may be determined by applying loyalty points identified in the loyalty point information to the offer for the item identified in the order information. In some embodiments, the instructions may include receiving input confirming purchase of the item included in the determined offer. The instructions may further comprise updating the loyalty point information associated with the account of the user based at least in part on the input. In some embodiments, the instructions may include identifying access credentials for ordering the item included in the determined offer from a particular merchant computer of the plurality of merchant computers where the access credentials associated with the account of the user. The instructions may further comprise ordering the item for delivery based on providing the access credentials to the particular merchant computer.

These and other embodiments of the invention are described in further detail below.

DETAILED DESCRIPTION

Figure 1:
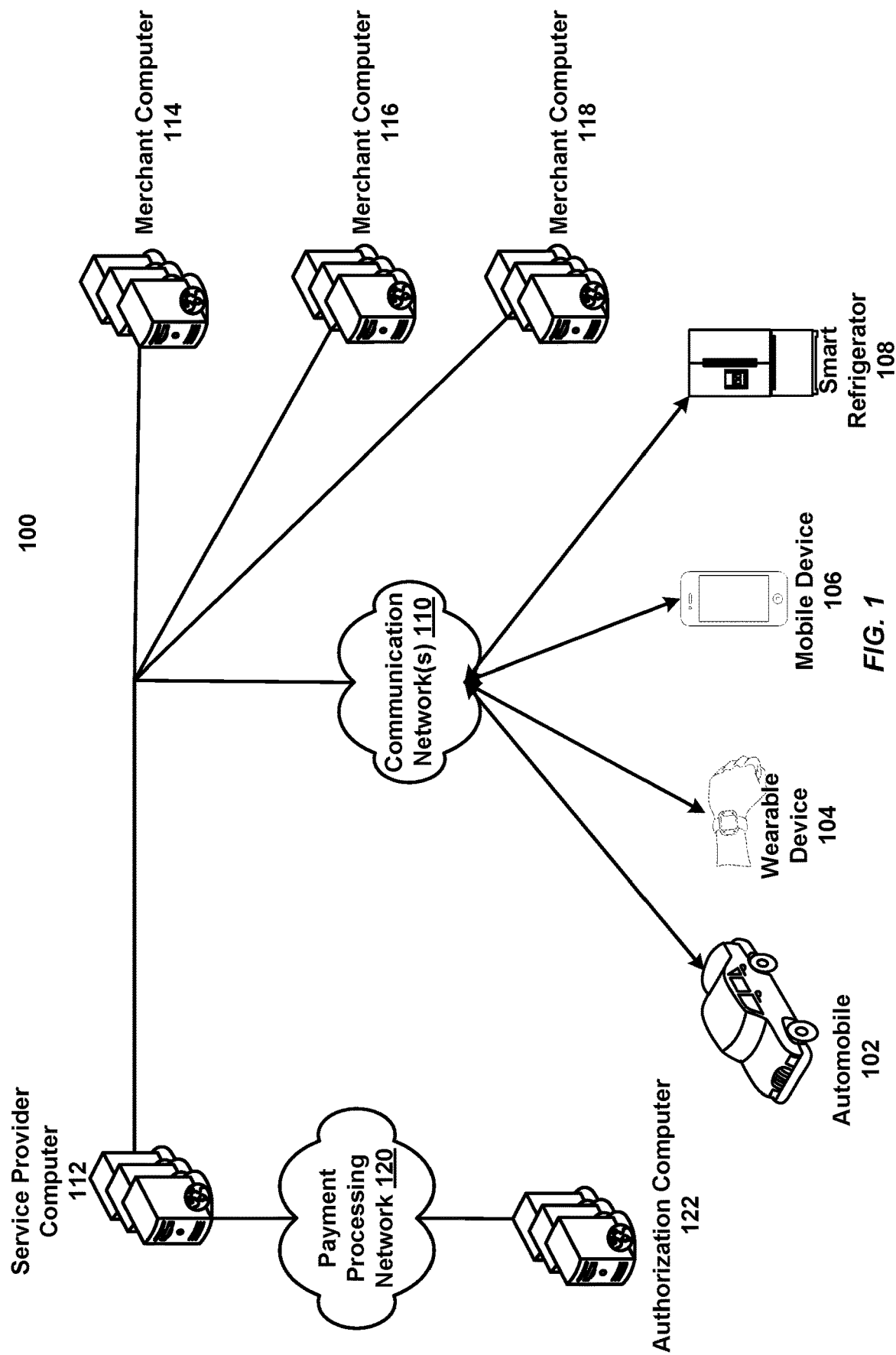
FIG. 1 depicts an example system architecture capable of implementing at least some embodiments of the current disclosure.

Some embodiments of the invention are related to utilizing Internet of Things devices, such as electronic appliances, to provide new commerce channels to users. For example, the electronic appliance can be enabled to allow a user to search for particular products, prices for products, best discounts for products, make purchases, redeem offers or reward/loyalty points, and set pickup or delivery options from a merchant. As such, a user can interact with an electronic appliance to make purchases in lieu of an in-store point of sale purchase or e-commerce website purchase. Purchases, offer presentations, or item searches can be presented and enabled by a connected device such as an electronic appliance thus providing a simple and personalized shopping experience to the user. In embodiments, the electronic appliance may be configured with an application that enables access and communication with a payment network, merchants, the user's payment information, and any suitable loyalty payment provider information such as reward points, current balances, or loyalty points. In some embodiments, each electronic appliance may store the user's payment information and loyalty payment provider information locally for determining best offers or redemption of offers provided by merchants.

In some embodiments, the electronic appliance, a service provider computer, or associated payment network can record and maintain user purchase preferences (items purchased, merchants ordered from, or other suitable item purchase information) and transaction history (payment accounts and particular rewards/loyalty programs utilized). In embodiments the electronic appliance may be configured to determine a best offer for an item or best item recommendation based on information obtained or maintained by a payment network for an account associated with a user. The maintained information can be utilized to recommend products or target advertisements that are tailored to the user's preference or transaction history thus providing a more desirable shopping experience for the user. For example, a user may inquire, via a user interface presented by an electronic appliance (i.e., a smart refrigerator), for a certain brand of milk. The electronic appliance may receive or obtain order information from a plurality of merchants available to deliver the certain brand of milk, loyalty/reward point information associated with the user, and transaction history and user preference information to determine the best offer for milk. The electronic appliance may, via the user interface, enable the user to utilize the reward points to complete the purchase of milk from a particular merchant and arrange for delivery to the user's home. In some embodiments the user may be enabled to utilize payment credentials stored on the electronic appliance and loyalty/reward points to complete the purchase of an item for delivery.

Embodiments of the invention provide several advantages. For example, a user does not have to enter any sensitive account information into any device during a transaction. Further, because purchases and inquiries can be made from the safety and privacy of one's own home security benefits are gained as the likelihood that a fraudster can visually obtain sensitive information is greatly reduced. Additionally, ease of use benefits for the user can be achieved as the user can easily shop, inquire, or purchase items from anywhere in their home where a connected device or electronic appliance is present and has access to a communication network (wireless or cellular network). A personalized shopping experience can be provided by systems and methods described herein as the system leverages a user's transaction history and preferences as well as geographic information to determine best offers, best delivery times, and best use of resources including reward/loyalty point information to reduce prices or complete purchases. An enrollment process can ensure that sensitive payment account information is provided once and thereafter payment credentials stored on the electronic appliance can be provided to merchant computers when completing purchases. Payment networks may be communicated with to authorize or authenticate transactions before providing payment credentials and or suitable information generated by digital wallets to merchants as well to ensure an additional level of security. Also, implementation of the invention described herein may include monetary advantages as networking (such as wireless, Bluetooth, cellular, or Near Field Communications), software, and hardware capabilities of electronic appliances and homes can be leveraged without purchasing additional infrastructure capabilities for in-store point of sale systems or e-commerce websites.

Embodiments of the invention, as discussed herein, may be described as pertaining to financial transactions and payment systems. However, embodiments of the invention can also be used in other systems. For example, instead of transmitting payment credentials and debiting loyalty point information to complete a transaction, access credentials may be stored on the electronic appliance for information access requests. As such, the electronic appliance may be utilized to gain access to secure data or information associated with a user.

Prior to discussing specific embodiments of the invention, some terms may be described in detail.

An "access credential" may be any data or portion of data used to gain access to a particular resource. In some embodiments, an access credential may be a login and/or password for a user account. In some embodiments, an access credential may include payment account information or a token associated with the payment account information, a cryptogram, a digital certificate, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "application" may be computer code or other data stored on a computer readable medium (e.g. memory element or secure element) that may be executable by a processor to complete a task. An application may include a mobile application. An application may be designed to streamline the process for ordering items for purchase or redeeming reward/loyalty points. An application may allow a user to interact with an electronic appliance to confirm the purchase of an item, be presented with a best offer, or inquire for a product search without having to enter identification information, sensitive payment information or present a physical card (such as a payment card).

An "authorization request message" may be an electronic message that requests authorization for a transaction. In some embodiments, it is sent to a transaction processing computer and/or an issuer of a payment card/payment account to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on an electronic appliance that is associated with the user. As described herein, a server computer may authenticate the user or authentication requests may be provided to the authorizing entity for authorization of the transaction.

An "electronic appliance" may be any suitable electronic device capable of communicating with, and/or interacting with other devices. An electronic appliance may have a primary function that is unrelated to communicating with other electronic appliances or devices. For example, an electronic appliance may be a refrigerator that, in addition to preserving food, is capable of interacting with one or more other electronic appliances. In some embodiments, an electronic appliance may be associated with a device identifier. Examples of electronic appliances may include refrigerators, thermostats, automobiles, televisions, personal music players, wearable devices (smart watches, fitness bands, ankle bracelets, rings, earrings, etc.), mobile phones, lamps, etc. In embodiments, the electronic appliances may provide or be configured to utilize remote communication capabilities such as a cellular network (3G, 4G, or similar networks), wireless data network, Wi-Fi, Wi-Max, or any other communication medium that may provide access to a network such as the Internet or a private network. An electronic appliance may include its own respective housing, data processor, and memory that is configured to run one or more software applications such as a communication application or order determination application.

Additional characteristics of the electronic appliance are described herein. For example, the electronic appliance can be associated with an owner, which may be a user. The electronic appliance can store various public and private data such as reward/loyalty point information, access credentials, etc. Further, the electronic appliance may have the capability to monitor its state by storing data gathered related to its behavior (e.g., usage data, shock data, etc.) and surrounding environment (e.g., temperature, humidity, etc.). The electronic appliance can also store ownership transfer data indicating a change in ownership of the electronic appliance from one owner to another owner. The electronic appliance may have the capability to encrypt data to provide access to certain data stored within the electronic appliance by specific owners or information providers such as acquirers or merchants. Further, data stored on the electronic appliance can be made unalterable, since data already stored by the electronic appliance can be locked during a change in ownership. Upon creation, the electronic appliance may be assigned at least one key pair, so that the electronic appliance itself can digitally sign certain data. The key pair can include a public key and a private key which may be assigned by a suitable trusted third party or the creator (e.g., manufacturer) of the electronic appliance. The private key from the key pair may be stored securely within the electronic appliance, such as in a secure element. In some embodiments, the private key may only exist within the electronic appliance (or it could exist within a software secure element that is only accessible by the electronic appliance and that is stored in a remote computer or cloud computer system). The public key may be accessible through a message or interface that can be utilized by an owner of the electronic appliance. In some embodiments, a user may participate in an enrollment process with a service provider to acquire the public private key pair which is subsequently stored in a secure element of the electronic appliance.

"Loyalty point information" may include any suitable information that identifies redeemable rewards that can be utilized to purchase or discount the price of items and services offered by merchants or other entities. In embodiments, the loyalty point information may include suitable information that identifies redeemable rewards that can be utilized to discount a purchase price that includes multiple products or items from one or more item categories. Generally, loyalty or reward points are earned by a user for utilizing a certain payment method (such as a particular credit card) or for engaging in business with an entity (such as a repeat customer for a particular merchant). In some embodiments, loyalty/reward points are associated with a user and can be utilized as a virtual currency. In some embodiments, loyalty point information may include loyalty points program information that identifies specific offers that a user qualifies for or specific benefits the user qualifies for based on their available point balance. For example, a specific offer may include one dollar off for the specific user on all future purchases when a certain number of points are earned. As another example, a specific benefit may include free delivery after a certain number of points are earned by the user.

A "merchant" may typically be an entity that engages in transactions and can sell goods or services, or provide access to goods or services. A "merchant computer" may be any suitable computer device capable of enabling a merchant to provide access to goods or services. Examples of a merchant computer may include computers maintained by merchants, data providers, etc.

"Order information" may include any suitable information related to an item or service offered by a merchant. In some embodiments, order information may include details for an item or service such as price, quantity, a description of the item or service, user reviews, etc.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments System) which processes authorization requests and a Base II system which performs clearing and settlement services. In some embodiments, the payment processing network maintains and updates reward/loyalty point accounts associated with a user of a payment account.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more electronic appliances.

A "user" may include an individual. In some embodiments, a user may be associated with an electronic appliance. The user may be associated with one or more accounts, payment accounts, reward/loyalty point accounts, and/or personal accounts. The user may also be referred to as a cardholder, account holder, or consumer.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. For example, memory elements are present in the automobile 102, wearable device 104, mobile device 106, and smart fridge 108, but are not specifically illustrated for clarity of illustration.

FIG. 1 illustrates an exemplary system 100 with at least some of the components for implementing embodiments of the invention. FIG. 1 includes several electronic appliances including an automobile 102, a wearable device 104, a mobile device 106, a smart refrigerator 108 communicating via communication networks 110 to a service provider computer 112 and merchant computers 114-118. The service provider computer 112 may implement or be a part of a payment processing network 120 that maintains loyalty point information for an account associated with a user and determines best offers by applying loyalty points to offers of items provided by merchant computers 114-118. FIG. 1 also includes an authorization computer 122 for receiving and processing authorization request messages and authorization response messages. Note that although the components in the system 100 are shown as discrete entities, they can be implemented in a single physical system or a distributed cloud based system.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. The components of FIG. 1 may communicate via any suitable communication medium (including the internet) using any suitable communication network.

As noted above, an electronic appliance may be any device capable of communicating with, and/or interacting with other electronic appliances. Each electronic appliance may be configured to perform one or more functions unrelated to the device's ability to interact. For example, the smart refrigerator 108 may comprise both refrigeration and computing capabilities. Although the smart refrigerator 108 may be primarily utilized as a means of storing and refrigerating food, it has secondary functions that allow it to communicate with other devices, receive and present information, and receive and process input from a user. The electronic appliance may include a device identifier which may be provided by a manufacturer of the electronic appliance. The device identifier may serve as a communication address for the electronic appliance. The electronic appliance may include a secure execution environment such as a secure memory (e.g., Smartcard based technology available in low-power devices). In some embodiments, the secure memory may include a secure element that can be a tamper-resistant platform capable of securely hosting applications and their confidential and cryptographic data.

As described herein, a user may interact with any of the electronic appliances 102-108 to query for items, offers, purchase an item, redeem consumer benefits such as loyalty points, and order items and services for delivery. Applications configured to run on the electronic appliances 102-109 may communicate with service provider computer 112 and merchant computers 114-118 via communications network 110 to receive item information, such as order information, for an item on behalf of a user. For example, a user who is driving automobile 102 may interact with a user interface associated with automobile 102 with the intention of ordering milk from a merchant. In response to receiving the query for offers for milk, the automobile 102 may communicate with merchant computers 114-118 to receive order information regarding milk. Simultaneously, the automobile 102 may communicate with the service provider computer 112 to request or obtain loyalty point information for accounts associated with the user. In some embodiments, the automobile 102 may determine a best offer for the milk by applying loyalty/reward points to an offer provided by merchant computers 114-118 thereby discounting the price of the milk. In some embodiments, the automobile 102 may determine that the loyalty points can be used to complete the purchase for milk. Thereafter, the automobile 102 may present the determined offer for milk to the user via the user interface and upon receiving input confirming the purchase, provide access credentials to the particular merchant computer to complete the transaction for delivery to the user. In some embodiments, the user may utilize monetary means to pay for an offer determined and presented via the automobile 102 and loyalty points may be credited to a loyalty point program account that is associated with the user.

In some embodiments, the electronic appliances 102-108 may store access credentials in corresponding secure elements that can be transmitted to merchant computers (114-118) to complete a transaction. In embodiments, the user may have engaged in an enrollment process with automobile 102 to provide device identifier information, payment account information, identity information, and other suitable information to configure the provision and storage of the access credentials in the automobile 102. In some embodiments, the enrollment process may be provided and maintained by the service provider computer 112 on behalf of a payment processing network 120 or other financial institute.

In some embodiments, prior to providing the access credentials, the automobile 102 may request authorization for the transaction from an authorization computer 122 via the service provider computer 112. In other embodiments, the automobile 102 may communicate directly with the authorization computer 122 to request authorization of the transaction. The authorization computer 122 may determine whether the transaction is authorized based on the device identifier of the electronic appliance 102, the access credential provided by the electronic appliance 102, cryptographic or private key signed information, or transaction information (merchant ID, item details such as price, quantity, etc.) provided by the electronic appliance 102. In some embodiments, the authorization computer 122 may provide an authorization response message to the automobile 102 authorizing the transaction which can trigger the automobile 102 providing the access credential to the merchant computers 114-118 to order the milk for delivery. In some embodiments, a merchant computer (such as merchant computer 114) may request authorization of the transaction via communication networks 110 utilizing the transaction information that includes the device identifier for an electronic appliance (102-108), a merchant identifier, transaction details such as price and quantity, or other suitable verification information utilized during a transaction. The authorization computer 122 may provide an authorization response message to the merchant computer 114 which can trigger the request for the access credential from the electronic appliance (102-108). Upon receiving the access credential, the merchant computer 114 may order the item or service included in the transaction for delivery to a user associated with the electronic appliance (102-108).

In some embodiments, the electronic appliances 102-108 may be configured to store and update user preferences and transaction preferences related to purchases made by the user. For example, smart refrigerator 108 may maintain and update user and transaction preferences regarding particular brands of an item preferred by the user, preferred merchants, preferred loyalty accounts to utilize, or preferred payment accounts. Further, each electronic appliance may be configured to store use statistics that identify how often a particular electronic appliance is utilized to order items, query for items, view advertisements or recommendations, etc. In embodiments, the electronic appliances 102-108 can utilize the user preference information to determine an offer for an item or to respond to an item query. For example, smart refrigerator 108 may utilize data points from the user preferences to identify a particular merchant associated with merchant computer 118 to determine an offer, using available loyalty points, for a particular brand of frozen pizza when a user queries for frozen pizza.

In some embodiments, the payment processing network 120 and service provider computer 112 may be configured to utilize transaction history (payment accounts utilized, locations where payment accounts were utilized, monetary amounts used at particular locations) to generate recommendations and advertisements that are targeted to the particular user. In some embodiments, the service provider computer 112 may be configured to utilize location based information associated with a user (such as GPS information associated with a device used by a user during a transaction) to generate offers. For example, offers within a certain geographical distance from the user may be generated based on their current location or based on recent locations associated with transactions conducted by the user using an access device or other computing device enabled to use GPS technology. For example, the user may frequent a particular ice cream parlor on the way home from work. In embodiments, merchants may be periodically queried for offers, sales, or discounts that can be presented to a user via an electronic appliance (such as electronic appliances 102-108). Thus, a user may be presented with information that is relative to their shopping experience (love of ice cream) without querying the electronic appliance and with minimal user input. In some embodiments, the electronic appliances 102-108 may be configured to periodically query merchant computer 114-118 for offers and discounts that would be applicable to the user (such as for items that the user has purchased, queried about, or viewed in the past).

Figure 2:
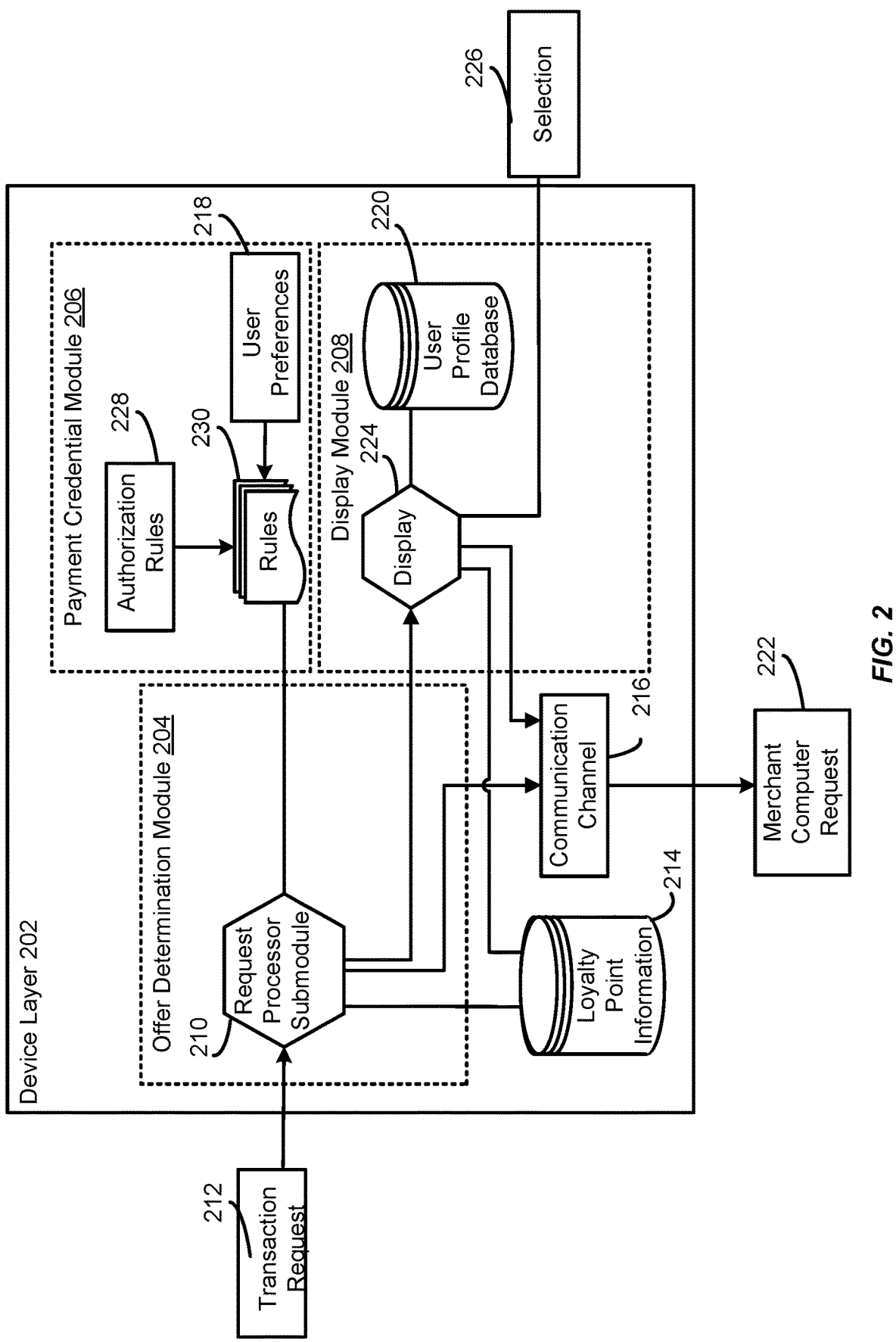
FIG. 2 depicts a block diagram of a system and a process flow according to embodiments of the current disclosure.

FIG. 2 depicts a block diagram of a system and a process flow according to embodiments of the current disclosure. In FIG. 2, device layer 202 is depicted as being an example device layer for an electronic appliance (such as appliances 102-108). The device layer 202 may include an offer determination module 204, a payment credential module 206, and a display module 208. In some embodiments, the offer determination module 204 may be programmed to cause an electronic appliance to process obtained/received information and determine an offer for an item. In the offer determination module 204, a request processor submodule 210 may receive a transaction request 212 from a user who wishes to purchase an item. In some embodiments, the request processor submodule 210 may have access to loyalty point information database 214. The loyalty point information database 214 may be configured to maintain loyalty points for various reward/loyalty program accounts associated with the user.

In some embodiments, the offer determination module 204 may communicate with outside sources, such as third parties or outside databases, to receive updated loyalty point information for a user. In embodiments, the offer determination module 204 may communicate with third party resources or databases via the communication channel 216. In some embodiments, the request processor submodule 210 may communicate with the payment credential module 206 to access rules derived from user preferences 218. For example, the user preferences 218 may be generated by the payment credential module 206 analyzing transaction history of the user utilizing particular payment accounts or interacting with particular merchants.

In some embodiments, the request processor submodule 210 may interact with display module 208 to access a user profile database 220. In some embodiments, the user profile database 220 may be configured to maintain information about the user including an address and telephone number for the user, and explicit preferences provided by the user during an enrollment process. For example, a user may specify during an enrollment process that they do not wish to receive offers or recommendations from merchants via their electronic appliances. In some embodiments, the request processor submodule 210 may make a merchant computer request 222 via the communication channel 216. The merchant computer request 222 can be a request for order information about the item inquired about or indicated in the transaction request 212 from a user. In embodiments, the request processor submodule 210 can provide multiple merchant computer requests to multiple merchant computers that are associated with merchants. In some embodiments, the request processor submodule 210 can utilize the user preferences 218 to determine one or more merchant computers to select when making a merchant computer request.

In some embodiments, the offer determination module 204 may utilize the order information and loyalty point information stored in database 214 to determine an offer for the item indicated in transaction request 212. For example, the offer determination module 204 may apply appropriate loyalty points as identified in the loyalty point information database 214 to offers provided by a plurality of merchant computers to determine a lowest price item for delivery to the user. In some embodiments, the loyalty points may be utilized to complete the purchase without any need for providing an exchange of monetary currency. The request processor submodule 210 may, upon determining the offer for the item, communicate with a display 224 of display module 208 to present the offer to the user associated with the electronic appliance implementing device layer 202. In embodiments, the display module 208 and display 224 may be configured to receive a selection 226 from the user. The selection 226 can be a confirmation from the user confirming order and purchase of the item included in the determined offer from a particular merchant. In some embodiments, the section 226 can include a selection of a particular offer from one or more offers determined by the offer determination module 204.

In some embodiments, the payment credential module 206 may be configured to, via the request processor submodule 210 and communication channel 216 provide access credentials to the merchant for completing the transaction. In embodiments, the payment credential module 206 may include authorization rules 228 which can be modified by user preferences 218 to form one or more rules 230 regarding authorization requests or purchase limits. For example, the authorization rules 228 may identify certain merchants which require authorization requests and response from a payment processing network prior to completing a transaction. The authorization rules 228 may be modified by user preferences 218 such as by utilizing a user specified threshold for a monetary amount that triggers an authorization request. In some embodiments, the authorization rules 228 may identify that an authorization must be performed when utilizing a particular electronic appliance (such as by an automobile but not via a smart refrigerator).

Further, a user may generate an authorization rule that restricts the user of a particular electronic appliance to a particular payment account. In some embodiments, the payment credential module 206 may be configured to store and utilize an access credential which can be transmitted to merchant computers for completing transactions and purchases. In embodiments, the electronic appliance may not store the access credential but request the access credential from a payment processing network or other suitable entity. In some embodiments, the authorization rules 228 may include an indication that a particular transaction type (e.g., transactions for more than a threshold value, transactions with a particular vendor, or any other suitable transaction type) must be approved by the user. In this scenario, the user may be contacted via the electronic appliance for approval (such as via the display 224) or via another electronic appliance or computer device (such as mobile phone).

Figure 3:
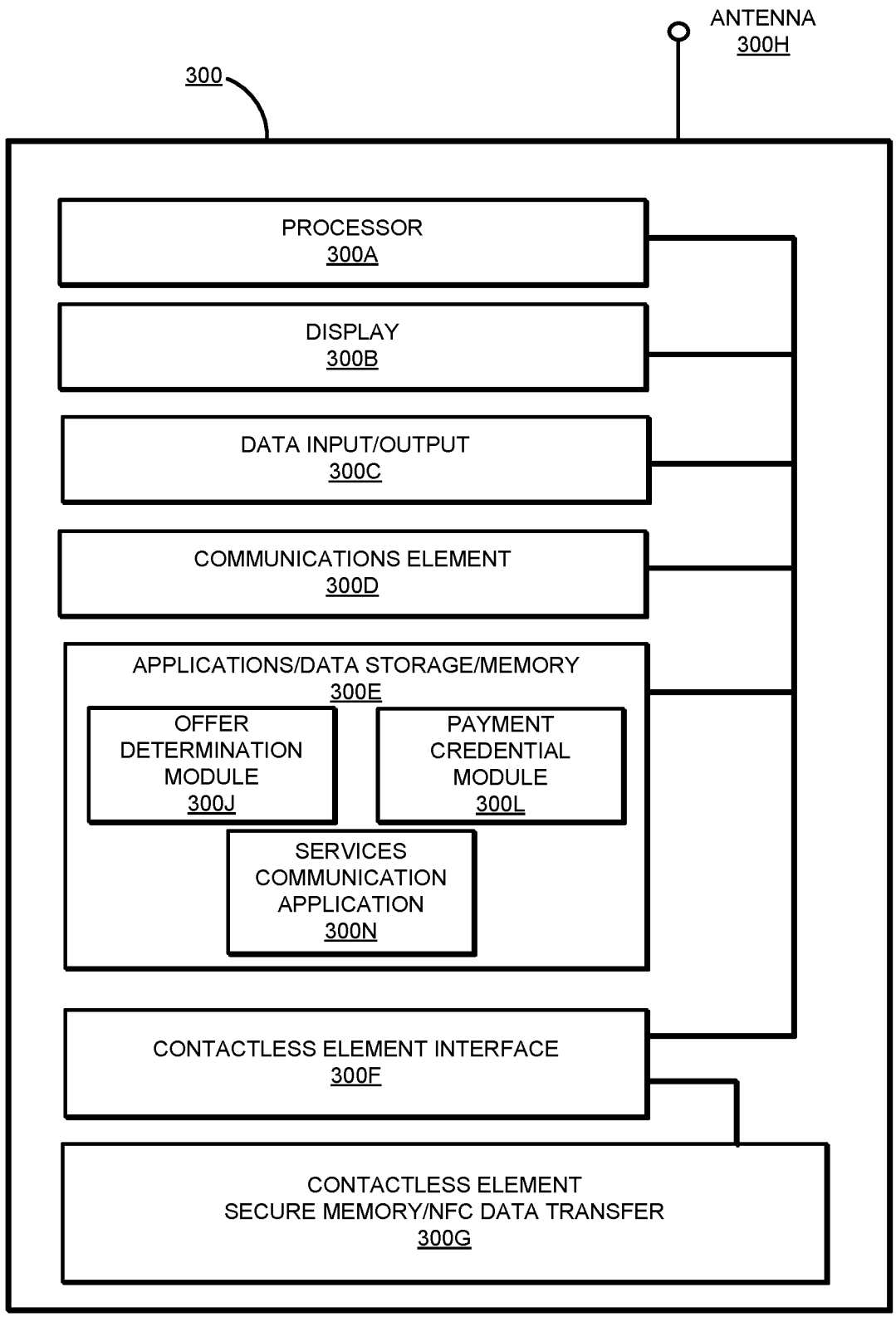
FIG. 3 depicts an exemplary electronic appliance according to embodiments of the current disclosure.

An example of an electronic appliance implementing the device layer 202, according to some embodiments of the invention, is shown in FIG. 3. Electronic appliance 300 may include circuitry that is used to enable certain device functions, such as refrigeration, temperature fluctuation, presentation of media, etc. The functional elements responsible for enabling those functions may include a processor 300A that can execute instructions that implement the functions and operations of the device. Processor 300A may access memory 300E (or another suitable data storage region or element) to retrieve instructions or data used in executing the instructions, such as provisioning scripts and applications. Data input/output elements 300C, such as a touchscreen, may be used to enable a user to operate the electronic appliance 300 and input data (e.g., confirmation of purchase, select a particular offer, or provide further authentication information).

Data input/output elements 300C may also be configured to output data (via a speaker or a touchscreen, for example). Display 300B may also be used to output data to a user. Communications element 300D may be used to enable data transfer between electronic appliance 300 and other electronic appliances, a payment process network, merchant computers, or a service provider computer via a wired or wireless network (via antenna 300H, for example) to assist in connectivity to the Internet or other network, and enabling data transfer functions (such as providing access credentials for completing a transaction). Electronic appliance 300 may also include contactless element interface 300F to enable data transfer between contactless element 300G and other elements of the electronic appliance 300, where contactless element 300G may include a secure memory and a near field communications data transfer element (or another form of short range communications technology).

The memory 300E may comprise an offer determination module 300J, a payment credential module 300L, services communication application 300N, and any other suitable module or data. The electronic appliance 300 may have any number of applications or modules installed or stored on the memory 300E and is not limited to that shown in FIG. 3. The memory 300E may also comprise code, executable by the processor 300A for implementing methods described herein. In some embodiments, modules 300J, 300L, and 300N may be invoked or accessed via application program interfaces provided by the service provider computer 112 to enable loyalty point redemption and offer determination as described herein.

The offer determination module 300J may utilize, in conjunction with the processor 300A, order information from one or more merchant computers, user preferences, transaction history, and loyalty point information to determine an offer for an item or provide a response to an item query including one or more offers. The offer determination module 300J and services communication application 300N, and the processor 300A, may be configured to communicate with one or more outside services or entities including merchant computers, a service provider computer, a payment processing network, loyalty/reward program entity, or other suitable entity for determining an offer for an item or service as described herein. In some embodiments, the offer determination module 300J and services communication application 300N, in conjunction with the processor 300A, may be configured to present offers determined by a payment processing network, a service provider computer implementing the offer determination described herein, or other entity, via the display 300B and data input/output 300C.

In some embodiments, the payment credential module 300L may, in conjunction with the processor 300A, be configured to transmit access credentials stored in the secure memory 300G to a particular merchant to complete a transaction. In embodiments, the payment credential module 300L and services communication application 300N may, in conjunction with the processor 300A, be configured to communicate with the payment processing network as part of an authorization request message prior to providing the access credential to the merchant. In some embodiments, in order to increase security, access credentials may not be stored at the electronic appliance 300. Instead, the access credentials can be temporarily retrieved from a remote server or cloud server when a transaction is being performed. In some embodiments, the payment credential module 300L may store and utilize one or more private-public key pairs to sign authorization requests for authorization by a payment network that issued or maintains the private-public key pairs.

In some embodiments, the payment credential module 300L may be issued a token from a payment processing network via the communications element 300D. The token can be used in place of or represent the access credential and add an additional layer of security to the sensitive payment account information of the user. In some embodiments, the payment credential module 300L may be programmed to cause the electronic appliance 300 to send a token request message to a payment processing network via communication channels typically used for authorization messages. For example, the payment credential module 300L may be programmed to cause the electronic appliance to send a token request message to the payment processing network 120, and the request may be forwarded through the communication networks 110 to the payment processing network 120.

Figure 4:
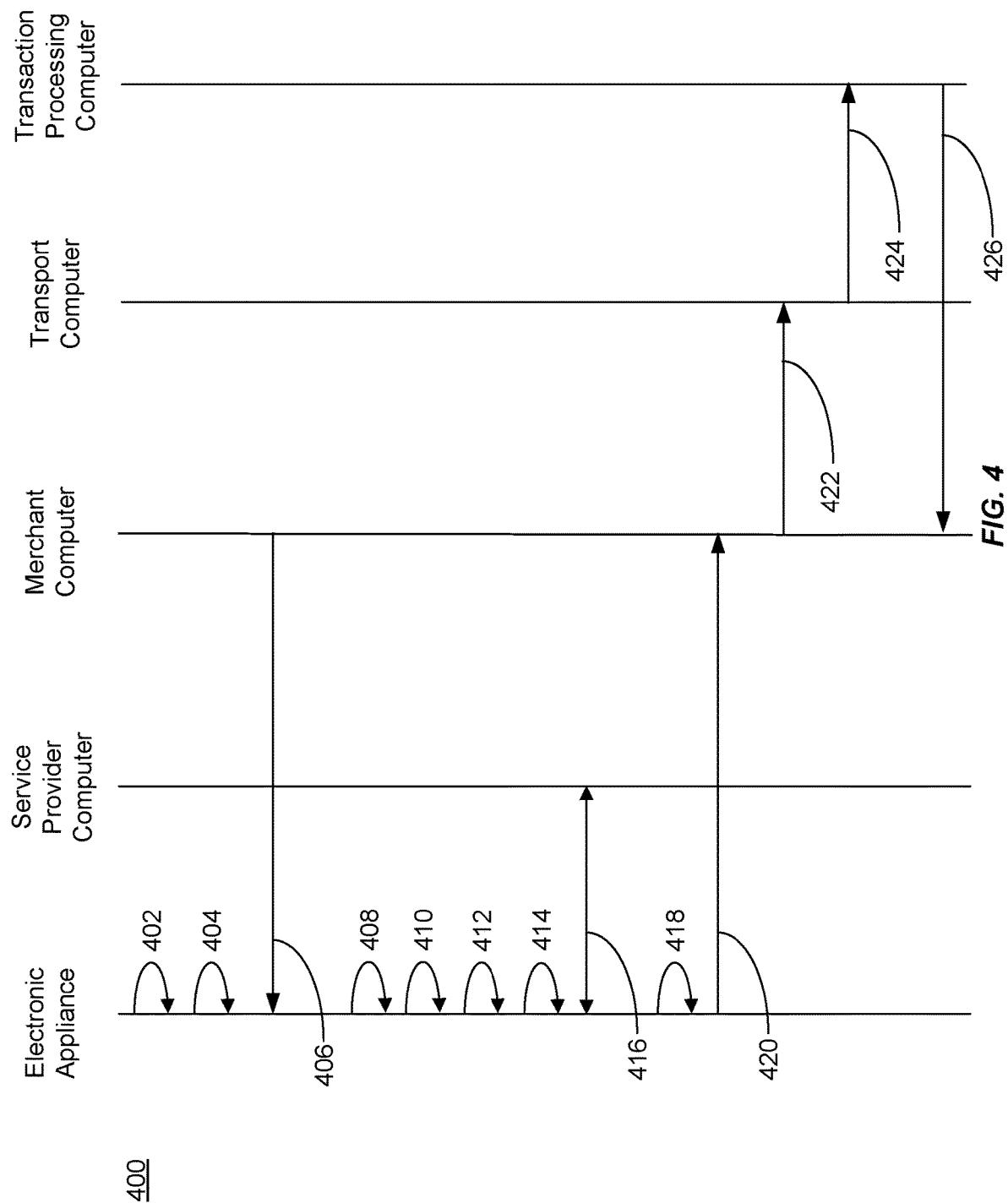
FIG. 4 depicts a diagram illustrating an example technique for completing a transaction via an electronic appliance according to embodiments of the current disclosure.

FIG. 4 depicts a diagram illustrating an example technique for completing a transaction via an electronic appliance according to embodiments of the current disclosure. The order in which the operations are described is not intended to be construed as a limitation, and any number of the described operations can be omitted or combined in any order and/or in parallel to implement this process and any other processes described herein.

Some or all of the process 400 (or any other processes described herein, or variations and/or combinations thereof) may be performed under the control of one or more computer systems configured with executable instructions and may be implemented as code (e.g., executable instructions, one or more computer programs, or one or more applications). In accordance with at least one embodiment, the process 400 of FIG. 4 may be performed by at least the one or more computer systems including service provider computer 112, payment processing network 120 (FIG. 1), or electronic appliance 300 including offer determination module 300J, payment credential module 300L, and services communication application 300N (FIG. 3). The code may be stored on a computer-readable storage medium, for example, in the form of a computer program including a plurality of instructions executable by one or more processors. The computer-readable storage medium may be non-transitory. The electronic appliance, service provider computer, merchant computer, transport computer, and transaction processing computer may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The process 400 may include receiving an indication of a purchase for an item at 402. In some embodiments, the electronic appliance may receive an indication of a purchase in response to a user indicating that they wish to purchase a particular item such as a particular brand of milk while in other cases the indication may include a query for a category of items or product line (best offer on whole milk) or an indication for offers and deals (best offers for food items). In some embodiments, the process 400 may include maintaining, by the electronic appliance, loyalty point information associated with an account of a user. For example, the electronic appliance may store, in a secure element, loyalty/reward information for a plurality of reward programs with which the user is associated. In some embodiments, the electronic appliance may be configured to communicate with a service provider computer, payment processing network, third party reward/loyalty program entity, or other outside database to obtain the loyalty point information for an account associated with the user.

The process 400 may include receiving, by the electronic appliance, order information about the item from a plurality of merchant computers at 406. For example, the electronic appliance may request order information such as item details, price, description, current offers, deals, and discounts, from a plurality of merchants via associated merchant computers. In some embodiments, the electronic appliance may apply user preferences and transaction history to determine one or more of the plurality of merchant computers to request order information. For example, the user preferences may indicate that the user wishes to only order from merchants that are within a certain distance from their home while the transaction history may indicate that particular merchants are utilized more frequently when ordering certain categories of items. In some embodiments, the electronic appliance may track and record the user preferences and transaction history as the user searches and purchases items with the electronic appliance. In some embodiments, the electronic appliance may communicate with a service provider computer, payment processing network, or other outside entity to request the user preferences and transaction history of a user. For example, the electronic appliance can utilize data retrieved from various payment accounts provided by one or more entities to track and record transaction history of the user as they utilize the payment accounts. In some embodiments, the merchant computers may periodically provide order information or offers to the electronic appliances associated with a user based on information provided by a user during an enrollment process with the service provider computer and/or the payment processing network. Merchant computers may identify appropriate electronic appliances associated with the user based on information provided by the user, or the electronic appliances utilized by the user, during the enrollment process. For example, a user may provide a unique device ID or other identifier to each electronic appliance they enroll in the service described herein. In some embodiments, the enrollment process may obtain device ID and address information (such as an internet protocol (IP) address, media access control (MAC) address) from the electronic appliances or users that can be utilized when communicating offers or order information to said electronic appliances.

The process 400 may include determining, by the electronic appliance, an offer for the item based on applying the loyalty point information to the order information received from the plurality of merchant computers at 408. In some embodiments, the electronic appliance can determine an offer for an item by applying loyalty/reward pints identified in the loyalty point information to discount a price indicated in the order information for an item. In some embodiments, the electronic appliance can determine an offer that utilizes loyalty/reward points to complete a purchase without requiring any other monetary transfer from a payment account associated with the user to complete the purchase. In embodiments, the electronic appliance an determine an appropriate amount of loyalty/reward points to award or credit to a loyalty point account associated with the user based on a monetary completion of a purchase. In embodiments, the service provider computer or payment processing network can utilize the loyalty point information and order information to determine one or more offers to present to a user via a user interface associated with the electronic appliance. The process 400 may include presenting, by the electronic appliance, the determined offer via a user interface associated with the electronic appliance at 410.

The process 400 may include receiving, at the electronic appliance, input via a user interface that confirms the purchase or order of the item included in the determined offer at 412. The process 400 may include updating the loyalty point information associated with the account of the user at 414. For example, a certain amount of loyalty/reward points will be debited and credited based on the offer selected by the user. In some embodiments, the process 400 may include transmitting updated transaction history and user preferences to a service provider computer at 416. The service provider computer may maintain preference information for a plurality of users enrolled in the service described herein. The process 400 may include identifying, by the electronic appliance, access credentials for ordering the item from a particular merchant computer based on device information associated with the electronic appliance at 418. The process 400 may include ordering, by the electronic appliance, for delivery by transmitting the access credentials to a particular merchant compute at 420. In embodiments, the access credential can enable the merchant computer to request a debit to a payment account that is associated with the user to complete the purchase.

The process 400 may include the merchant computer requesting that the transaction for the item be authorized by providing an authentication request message to the transport computer (which may be an acquirer computer) at 422. The transport computer may be associated with the service provider computer or merchant computer, and may manage authorization requests on behalf of either computer.

FIG. 4 also includes a transaction processing computer which may be disposed between the transport computer and an issuer computer (not shown). The transaction processing computer may include data processing subsystems, networks, and operations used to support and deliver authorization services, exception file services, and clearing and settlement services. For example, the transaction processing computer may comprise a server coupled to a network interface (e.g., by an external communication interface), and databases of information. The transaction processing computer may be representative of a transaction processing network or payment processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer may use any suitable wired or wireless network, including the Internet. The process 400 may include the transport computer requesting authorization of the transaction via the transaction processing computer at 424. The process 400 may include the transaction processing computer providing an authorization response message to the merchant computer at 426. In some embodiments, the merchant computer may proceed with completing the transaction upon receiving the authorization response message. In embodiments, the transaction processing computer may provide the authorization response message directly to the electronic appliance to enable the electronic appliance to transmit the access credential to a merchant to complete the transaction. A clearing and settlement process can occur at the end of the day or at any other suitable time period.

In some embodiments, the issuer computer may issue and manage a payment account and an associated payment device of a user. The issuer computer may be able authorize transactions that involve the payment account. Before authorizing a transaction, the issuer computer may authenticate payment credentials received in the authorization request, and check that there is available credit or funds in an associated payment account. The issuer computer may also receive and/or determine a risk level associated with the transaction, and may weigh the risk when deciding whether or not to authorize the transaction. If the issuer computer receives an authorization request that includes a payment token, the issuer computer may be able to de-tokenize the payment token in order to obtain the associated payment credentials.

Figure 5:
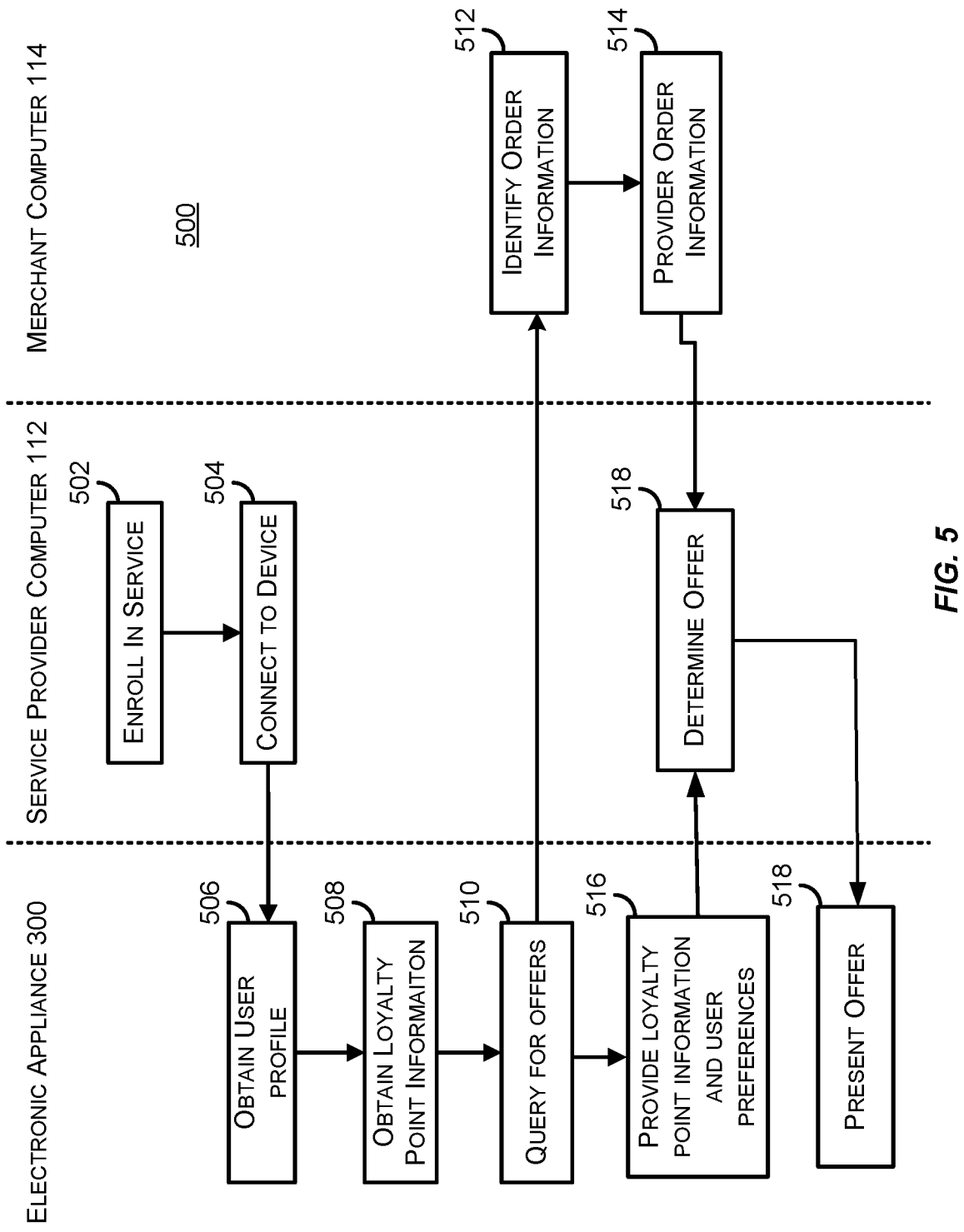
FIG. 5 depicts a diagram illustrating an example technique for determining an offer via an electronic appliance according to embodiments of the current disclosure.

FIG. 5 depicts a diagram illustrating an example technique for determining an offer via an electronic appliance according to embodiments of the current disclosure. FIG. 5 includes an electronic appliance 300, a service provider computer 112, and a merchant computer 114. For simplicity of illustration, a certain number of components are shown in FIG. 5. It is understood, however, that embodiments of the invention may include more than one of each component. In addition, some embodiments of the invention may include fewer than or greater than all of the components shown in FIG. 5. The components of FIG. 5 may communicate via any suitable communication medium (including the internet) using any suitable communication network. The service provider computer 112 may implement certain services and functions for enrolling a user in a service to determine offers, recommendations, and targeted advertisements by redeeming loyalty/reward points that are maintained by either the service provider computer 112, electronic appliance 300, or other third party entity. In some embodiments, the service provider computer 112 may be configured to perform one or more operations described herein that can be performed on or by the electronic appliance such as determining an offer, maintaining and updating loyalty point information, transaction history, and user preferences, etc.

The process 500 illustrated in FIG. 5 may include a user enrolling in a service at 502 to be presented with offers, respond to search queries, or present targeted advertisements as described herein. A user may enroll in the service with the service provider computer with one or more electronic appliances where each appliance can be linked or associated with a different payment account or loyalty/reward point account. In some embodiments, the process 500 may include connecting to the electronic appliance 300 by the service provider computer 112 at 504. The service provider computer 112 may communicate with the electronic appliance 300 via any suitable communication network including wireless, wired, or cellular communication networks. The process 500 may include obtaining, by the electronic appliance 300, a user profile of a user associated with the electronic appliance 300. The user profile may include personal information about the user such as their address, telephone number, email, etc., as well as user specified preferences for interacting with merchants or ordering items and services. In some embodiments, obtaining the user profile 506 may include the electronic appliance 300 communicating with the service provider computer 112, a payment processing network, or other third party entity that maintains such information (such as a secure database).

The process 500 may include the electronic appliance 300 obtaining loyalty point information at 508. As described herein, the electronic appliance 300 may be configured to record and track the earning and debiting of reward/loyalty points for one or more loyalty reward programs that a user is associated with. In some embodiments, the electronic appliance 300 may obtain the loyalty point information 508 by communicating with the service provider computer 112, a payment processing network, or a third party entity. The process 500 may include the electronic appliance 300 querying for offers of items and services from a merchant computer at 510. In some embodiments, the query for offers may be performed periodically by the electronic appliance 300 without input provided by a user. In still some embodiments, the query for offers may be in response to an indication of a purchase for an item by a user or input identifying a query or search for offers on one or more items.

The process 500 may include the merchant computer 114 identifying order information at 512. In some embodiments, the order information may include item or service details (such as price, quantity, description, user reviews). The process 500 may include the merchant computer 114 providing order information to the service provider computer 112 at 514. In some embodiments, the service provider computer 112 may obtain or receive order information from a plurality of merchant computers. The process 500 may include the electronic appliance 300 providing the loyalty point information and user preferences to the service provider computer at 516. The process 500 may include the service provider computer 518 determining an offer in response to the query for offers 510 utilizing the loyalty point information, user preferences, and order information from the electronic appliance 300 and merchant computer 114. The determination of the offer 518 by the service provider computer 112 may include determining a lowest price offer (either by applying loyalty points to discount a price or completely purchase the item or service), a fastest delivery offer, a highest user review offer, or an offer that complies with user preferences. The process 500 may include the service provider computer 112 communicating the determined offer for presentation via the electronic appliance 300 at 518. The electronic appliance 300 may present the offer to a user via a user interface associated with the electronic appliance 300. In some embodiments, the service provider computer 112 may provide the determined offer to another electronic appliance or computer device (such as a mobile phone) from which the user can confirm purchase or order of the item/service for delivery. For example, although the user my query for an item from a smart refrigerator they may receive the information about the determined offer via their mobile phone. Thereafter, the user can confirm purchase or order of the item/service via the electronic appliance 300 or other computer device.

As described herein, a computer system may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:
1. A method comprising:
receiving, by a first electronic appliance, an indication of a purchase for an item;
maintaining, by the first electronic appliance, loyalty point information associated with an account of a user;
receiving, by the first electronic appliance, order information about the item from a plurality of merchant computers;
determining, by the first electronic appliance, an offer for the item based at least in part on the loyalty point information, the order information from the plurality of merchant computers, geographic locations of merchants associated with the order information from previous orders by the user, particular payment accounts utilized by the user, and a transaction history of the user, wherein the offer is determined by applying loyalty points identified in the loyalty point information to the offer for the item identified in the order information, wherein the transaction history of the user identifies a plurality of merchants associated with the plurality of merchant computers that the user has ordered from historically, particular loyalty programs previously utilized by the user with the plurality of merchants, and monetary amounts previously utilized by the user when ordering the item;
generating, by the first electronic appliance, a plurality of authorization rules for ordering from the plurality of merchant computers based on preferences provided by the user during an enrollment process, wherein the plurality of authorization rules include identifying a transaction threshold, a particular payment account, an identity of a particular merchant for requesting authorization by an authorization computer prior to ordering the item for delivery from the particular merchant, and requiring that user input be provided via a particular second electronic appliance of a plurality of second electronic appliances associated with the user prior to ordering the item for delivery based at least in part on a user specified threshold of a transaction for the item, the user input confirming ordering of the item;
presenting, by the first electronic appliance, the determined offer via a user interface associated with the first electronic appliance;
receiving, by the first electronic appliance and from the particular second electronic appliance, the user input confirming purchase of the item included in the determined offer based at least in part on the plurality of authorization rules and the user specified threshold;
updating, by the first electronic appliance, the loyalty point information associated with the account of the user;
identifying, by the first electronic appliance, access credentials for ordering the item from a particular merchant computer of the plurality of merchant computers based on device information associated with the first electronic appliance and the user input received from the particular second electronic appliance according to the plurality of authorization rules; and
ordering, by the first electronic appliance from the particular merchant computer, the item for delivery based on providing the access credentials to the particular merchant computer.
2. The method of claim 1, wherein ordering the item for delivery includes identifying a location of the user.
3. The method of claim 2, wherein the account includes the location of the user.

4. The method of claim 1, further comprising providing, to an authorization computer, the access credentials for an authorization request.

5. The method of claim 4, wherein the authorization request is signed by a private key maintained by the first electronic appliance.

6. The method of claim 4, wherein ordering the item for delivery is based at least in part on receiving, from the authorization computer, an authorization response based on the authorization request.

7. The method of claim 1, wherein receiving the user input confirming the purchase of the item included in the determined offer includes utilizing the loyalty points to complete the purchase.

8. The method of claim 1, wherein identifying, by the access credentials for ordering the item from the particular merchant computer is further based on comparing the device information of the first electronic appliance to enrollment information maintained by a service provider computer.

9. The method of claim 1, wherein receiving the order information about the item from the plurality of merchant computers is in response to a periodic request for the order information provided by the first electronic appliance.

10. The method of claim 9, wherein a frequency of the periodic request is based on the preferences specified by the user.

11. The method of claim 1, further comprising:
generating, by the first electronic appliance, an advertisement for one or more other items based on an item category of the item and the one or more other items; and
presenting, by the first electronic appliance, the advertisement for the one or more other items.

12. A first electronic appliance comprising:
a processor; and
a memory element including instructions that, when executed with the processor, cause the first electronic appliance to, at least:
maintain loyalty point information for an account of a user;
receive, from a service computer, user profile information for the user identifying activity of the user with one or more merchants offering an item;
request, from a plurality of merchant computers, offer information for the item based at least in part on the user profile information;
determine an offer for the item based at least in part on the loyalty point information and the offer information from the plurality of merchants, geographic locations of merchants associated with order information from previous orders by the user, particular payment accounts utilized by the user, and a transaction history of the user, wherein the offer is determined by applying loyalty points identified in the loyalty point information to the offer for the item from a merchant of the one or more merchants, and wherein the transaction history of the user identifies a plurality of merchants associated with the plurality of merchant computers that the user has ordered from historically, particular loyalty programs previously utilized by the user with the plurality of merchants, and monetary amounts previously utilized by the user when ordering the item;
generate a plurality of authorization rules for ordering from the plurality of merchants based on preferences provided by the user during an enrollment process, wherein the plurality of authorization rules include identifying a transaction threshold, a particular payment account, an identity of the particular merchant for requesting authorization by an authorization computer prior to ordering the item for delivery from the particular merchant, and requiring that user input be provided via a particular second electronic appliance of a plurality of second electronic appliances associated with the user prior to ordering the item for delivery based at least in part on a user specified threshold of a transaction for the item, the user input confirming ordering of the item;
in response to presenting, by the first electronic appliance, the offer to the user:
receive, from the particular second electronic appliance, the user input from the user selecting a payment option for the offer of the item from the merchant based at least in part on the plurality of authorization rules and the user specified threshold, the payment option including at least one of the loyalty points identified in the loyalty point information for the account of the user or access credentials that are associated with a payment account of the user, the access credentials identified based at least in part on the user input received from the particular second electronic appliance according to the plurality of authorization rules;
transmit, to a merchant computer of the merchant, payment information corresponding to the payment option received from the user for ordering the item; and
transmit, to the merchant computer of the merchant, delivery information for delivering the item to the user based at least in part on the user profile information.

13. A method, comprising:
receiving, by a first electronic appliance, a query for offers of an item;
maintaining, by the first electronic appliance, loyalty point information associated with an account of a user;
receiving, by the first electronic appliance and from a plurality of merchant computers, order information about the item;
determining, by the first electronic appliance, an offer for the item based at least in part on the loyalty point information, the order information from the plurality of merchant computers, geographic locations of merchants associated with the order information from previous orders by the user, particular payment accounts utilized by the user, and a transaction history of the user, wherein the offer is determined by applying loyalty points identified in the loyalty point information to the offer for the item identified in the order information, wherein the transaction history of the user identifies a plurality of merchants associated with the plurality of merchant computers that the user has ordered from historically, particular loyalty programs previously utilized by the user with the plurality of merchants, and monetary amounts previously utilized by the user when ordering the item;
generating, by the first electronic appliance, a plurality of authorization rules for ordering from the plurality of merchant computers based on preferences provided by the user during an enrollment process, wherein the plurality of authorization rules include identifying a transaction threshold, a particular payment account, an identity of a particular merchant for requesting authorization by an authorization computer prior to ordering the item for delivery from the particular merchant, and requiring that user input be provided via a particular second electronic appliance of a plurality of second electronic appliances associated with the user prior to ordering the item for delivery based at least in part on a user specified threshold of a transaction for the item, the user input confirming ordering of the item;

receiving, by the first electronic appliance and from the particular second electronic appliance, the user input confirming purchase of the item included in the determined offer based at least in part on the plurality of authorization rules and the user specified threshold;

updating, by the first electronic appliance, the loyalty point information associated with the account of the user based at least in part on the user input;

identifying, by the first electronic appliance, access credentials for ordering the item included in the determined offer from a particular merchant computer of the plurality of merchant computers, the access credentials associated with the account of the user and identified based on the user input received from the particular second electronic appliance according to the plurality of authorization rules; and ordering, by the first electronic appliance, the item for delivery based on providing the access credentials to the particular merchant computer.

14. The method of claim 13, wherein receiving order information from the plurality of merchant computers about the item is based at least in part on a geographic distance between a location of the first electronic appliance associated with the user and a merchant associated with at least one of the plurality of merchant computers.

15. The method of claim 13, wherein the access credentials identify a payment account associated with the user.

16. The method of claim 13, further comprising presenting the determined offer to the user before a certain time period expires, the certain time period identified based on when the query for offers of the item was received.

* * * * *